Jan. 19, 1937.　　　R. PERILLARD　　　2,068,278
BRAKE CONSTRUCTION
Filed Jan. 18, 1936　　　2 Sheets-Sheet 1
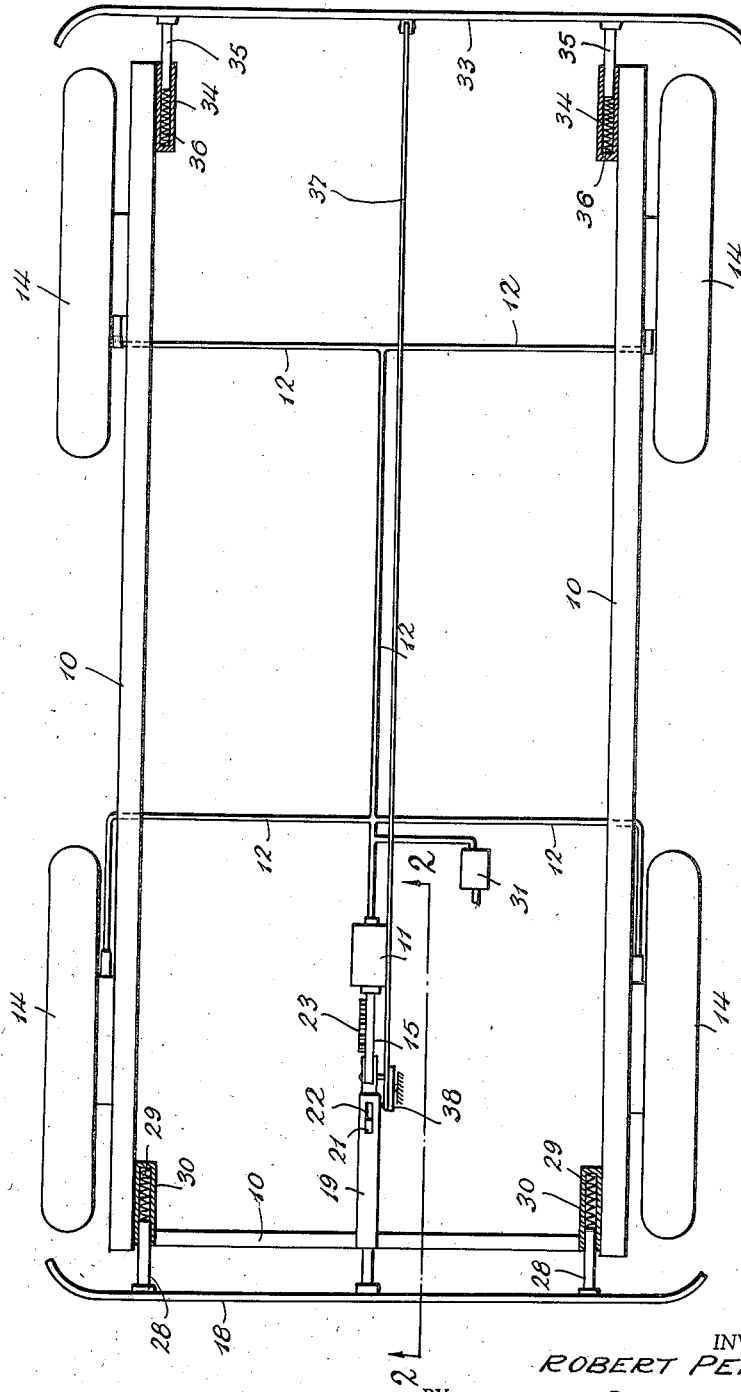
INVENTOR.
ROBERT PERILLARD
BY
Richards & Geier
ATTORNEYS Jan. 19, 1937.　　　R. PERILLARD　　　2,068,278
BRAKE CONSTRUCTION
Filed Jan. 18, 1936　　　2 Sheets-Sheet 2
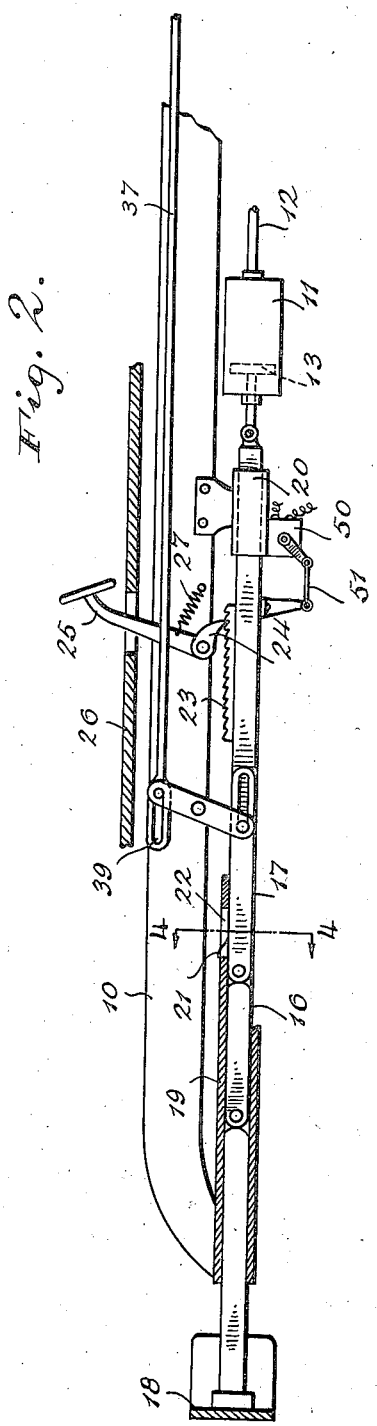
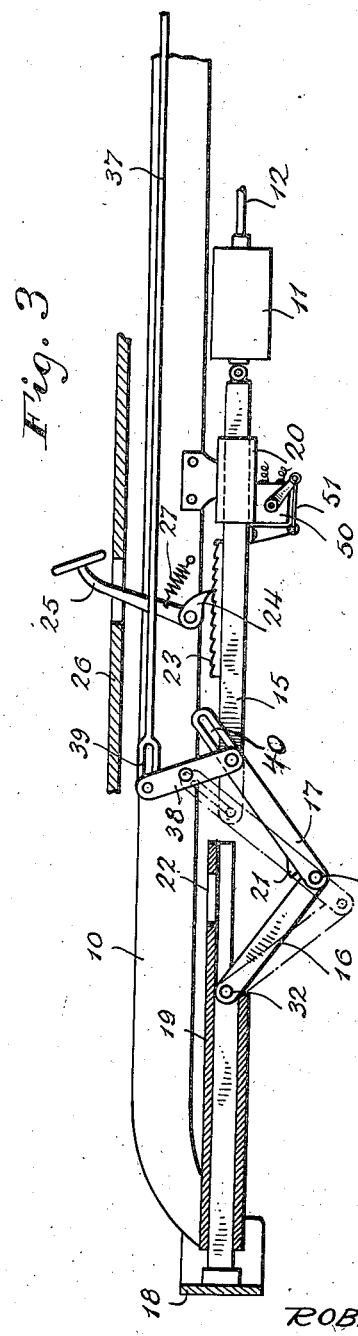
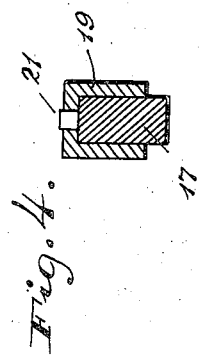
INVENTOR.
ROBERT PERILLARD
BY
Richards & Geier
ATTORNEYS Patented Jan. 19, 1937

2,068,278

UNITED STATES PATENT OFFICE 2,068,278

BRAKE CONSTRUCTION

Robert Perillard, New York, N. Y.

Application January 18, 1936, Serial No. 59,649

11 Claims. (Cl. 180—83)

This invention relates to automobiles and the like and particularly to the brake system thereof.

The main object of the invention is to provide a brake system which automatically applies the brakes when the automobile hits an object.

Another object is to provide a combination brake and bumper which will lessen the force of the impact in the event of collision.

Still another object is to provide a brake system which will promote safety and prevent "hit and run" driving.

A further object is to prevent loss of control of the automobile after a collision.

Other objects and advantages will become apparent as the specification proceeds.

It is a well-known fact that a great number of accidents are caused by loss of control of the vehicle after a collision. The impact usually causes the automobile to careen to the side of the road and it may collide with another vehicle, roll down an embankment or be crushed against some obstruction along the side of the road, etc. These accidents are generally caused by the driver's failure to apply the brakes because of the loss of presence of mind or because of the fact that the driver has been knocked unconscious by the impact. It is an established fact that not only inexperienced drivers suffer from the paralyzing effect of a collision upon the power of reasoning and determination but also veteran drivers.

Many drivers also become obsessed with the idea of getting away from the place of collision as quickly as possible and in their get-away cause further accidents and damage. This desire to escape from the place of accident is as a rule, not deliberate but is generally caused by the uncontrollable fright produced by the collision.

Accidents of this type could be easily avoided if only the driver were given the opportunity of a moment's reflection. Unfortunately, the actions of all people are not intuitive or reflexive, but requires the process of thought.

With this idea in mind the present invention has been designed. The part of the vehicle which will first either strike or be struck is the front or rear bumper. Consequently, if this first impact causes the brakes to respond, the extent of the accident will be considerably minimized.

The force of the inertia of the vehicle will naturally tend to force it farther ahead. In conventional vehicles, the first impact merely bends the bumper and the body of the vehicle forges ahead until the force of the inertia is overcome by the resistance of the object struck often resulting in extensive damage to property and serious injuries to the occupants.

These and other disadvantages may be overcome by having the bumper of the vehicle cooperate with the brakes. Thus, at the moment of first impact, sufficiently hard to cause damage under ordinary circumstances, the brakes will be applied and the vehicle stopped.

The invention will be better understood when considered in connection with the accompanying drawings which illustrate a preferred embodiment of the inventive concept.

In the drawings;

Figure 1 is a schematic view of a brake system illustrating the invention.

Figure 2 is a sectional view along the line 2—2 of Figure 1.

Figure 3 is a similar view showing the bumper-brake rod in a different position.

Figure 4 is a sectional view along the line 4—4 of Figure 2.

As exemplified in the drawings, the frame 10 is provided with a brake system comprising a brake fluid cylinder 11 and fluid conduits 12. Within the cylinder 11 is a hydraulic piston 13 which exerts pressure on the brake fluid and which operation in turn applies the brake mounted within the wheels 14. A shaft 15 provided with links 16 and 17 connects the hydraulic piston 13 with the front bumper 18. This shaft 15 is reciprocable within the forward guide 19 which partly covers the same and the rear guide 20 which guides are carried on the frame 10. A nose 21 is provided on the link 17 and which nose in normal position of the bumper projects through the slot 22 in the guide 19.

A ratchet or rack 23 may be provided on the shaft 15 and a pawl 24 operated by means of a foot release 25 or similar mechanism protruding through the floor board 26 may hold the brakes in locked position after the impact. A retractile spring 27 may be provided to replace the foot release 25 to normal position.

The bumper 18 is resiliently supported in the frame by means of pistons 28 resting against the helical springs 29 in sockets 30 in the frame 10. A foot brake control cylinder 31 is provided for the normal operation of the brake system.

The operation of the mechanism is as follows:—When the bumper 18 strikes an object sufficiently hard to counteract the force of springs 29, the impact will push the bumper and the shaft 15 backward and exert pressure on the brake fluid in the cylinder 11 which operation in turn will apply the brakes. As the shaft 15 is pushed farther backward by the force of the impact, the nose 21 will strike against the rear wall of the slot 22 pushing the link 17 downward.

As will be noted from the drawings, the bottom portion of the guide 19 has been cut off or grooved, and the portion of the link 16 normally covered thereby entirely corresponds to the length of the slot 22. Thus, when the nose 21 strikes against the rear wall of the slot, the joints 32 will be outside the bottom portion of the guide, and upon further backward movement of the bumper and shaft, the links 16 and 17 will collapse, preventing further pressure on the brake fluid and consequent damage to the cylinder 11.

After release of the pawl 24, the springs 29 will retract the bumper and shaft to its normal position.

The rear bumper 33 which is resiliently mounted in sockets 34 by means of pistons 35 and springs 36, may be operated in a similar manner. A rod 37 connects the bumper 33 with one arm of the lever 38 pivoted to the frame 10. The other arm of the lever is connected to the shaft 15.

To prevent the rear bumper being retracted when the impact is on the front bumper, a "lost motion" device, exemplified in the drawings by a slot 39, may be provided.

A similar device may be used to provide for relative longitudinal motion between the link 17 and the front portion of the shaft 15 in order to prevent retraction of the front bumper, when the impact is on the rear bumper as exemplified by slot 40 in link 17. In normal position, the forward wall of the slot rests against the pivot connecting the link 17 with the front portion of the shaft 15.

Since the impact on the rear bumper is usually of lesser force, it is not thought necessary to make the rod 37 collapsible, but it is obvious that if required, an arrangement similar to that of the front bumper may be provided.

The brake system may be connected to the ignition system so that the ignition will be cut off automatically as soon as the brakes are applied. This is illustrated in the drawings by means of a link 51 attached to the shaft 15 and connected to a rotary switch (not shown) within the housing 50.

It is obvious that various modifications may be made in the example illustrated in the drawings without departing from the scope of the invention, the general idea of which is to make the brake system respond to an impact on the bumper of the vehicle.

Although the example illustrated shows the application of the invention to a hydraulic brake system, it is obvious that it may equally well be applied to a mechanical system without departing from the spirit of the invention.

Having fully described the invention, what is claimed is:—

1. The combination with a vehicle frame and a hydraulic brake system carried by said frame comprising a hydraulic cylinder and a piston in said cylinder, of a bumper resiliently mounted on said frame, a reciprocable collapsible shaft normally rigid connecting said bumper with said hydraulic piston, whereby an impact on said bumper will actuate said brake system, a guide for said shaft carried by said frame and means associated with said guide for collapsing said shaft after a predetermined motion whereby further pressure on said hydraulic piston after the actuation of the brake system is prevented.

2. The combination with a vehicle frame and a hydraulic brake system carried by said frame comprising a hydraulic cylinder and a piston, of a bumper resiliently mounted on said frame, a reciprocable shaft normally rigid connecting said bumper with said hydraulic piston, whereby an impact on said bumper will actuate said brake system, said shaft comprising a plurality of links pivoted to each other, a guide for said shaft carried by said frame, a nose on one of said links, a slot in said guide for said nose, whereby said shaft may be collapsed, and means in said guide for allowing said links to fold together, whereby pressure on said hydraulic piston after the actuation of the brake system is prevented.

3. The combination with a vehicle frame and a brake system carried by said frame, of a front bumper and a rear bumper resiliently mounted on said frame, a shaft connecting said front bumper with said brake system, a lever pivoted to said frame having one arm connected to said shaft and a rod connecting said rear bumper with the other arm of said lever whereby an impact on either bumper will actuate said brake system, means associated with said rod and separate means associated with said shaft for preventing actuation of one bumper when the impact occurs on the other.

4. The combination with a vehicle frame and a hydraulic brake system carried by said frame comprising a hydraulic cylinder and a piston, of a front bumper and a rear bumper both resiliently mounted on said frame, a reciprocable collapsible shaft normally rigid connecting said front bumper with said hydraulic piston, a lever pivoted to said frame having one arm connected to said shaft, a rod connecting said rear bumper with the other arm of said lever, whereby an impact on either bumper will actuate said brake system, means associated with said rod and separate means associated with said shaft for preventing actuation of one bumper when the impact occurs on the other, a guide for said shaft carried by said frame and means associated with said guide for collapsing said shaft after a predetermined motion, whereby further pressure on said hydraulic piston after the actuation of the brake system is prevented.

5. The combination with a vehicle frame and a hydraulic brake system carried by said frame comprising a hydraulic cylinder and a piston, of a front bumper and a rear bumper both resiliently mounted on said frame, a reciprocable collapsible shaft normally rigid connecting said front bumper with said hydraulic piston, a lever pivoted to said frame having one arm connected to said shaft, a rod connecting said rear bumper with the other arm of said lever, whereby an impact on either bumper will actuate said brake system, means associated with said rod and separate means associated with said shaft for preventing actuation of one bumper when the impact occurs on the other, said shaft comprising a plurality of links pivoted to each other, a guide for said shaft carried by said frame, a nose on one of said links, a slot in said guide for said nose, whereby said shaft may be collapsed, and means in said guide for allowing said links to fold together, whereby pressure on said hydraulic piston after the actuation of the brake system is prevented.

6. The combination of a vehicle frame and a hydraulic brake system carried by said frame comprising a hydraulic cylinder and piston adapted for pedal operation, and a separate cylinder member and a piston member; a bumper mounted on said frame and a shaft member connecting said bumper with one of said members whereby an impact on said bumper will actuate said brake system.

7. The combination with a vehicle frame and a hydraulic brake system carried by said frame comprising a hydraulic cylinder member and a piston member; of a bumper mounted on said frame, a shaft member connecting said bumper with one of said members, whereby an impact on said bumper will actuate said brake system, and means in said frame for preventing actuation of said brake system after a predetermined motion of said shaft.

8. The combination with a vehicle frame and a hydraulic brake system carried by said frame comprising a hydraulic cylinder and a piston; of a bumper reciprocably mounted on said frame and a shaft member connecting said bumper and said piston whereby an impact on said bumper will actuate said brake system, said shaft member being collapsible whereby pressure on said hydraulic piston is prevented after the actuation of the brake system.

9. The combination with a vehicle frame and a hydraulic brake system carried by said frame comprising a hydraulic cylinder and a piston; a reciprocable collapsible shaft connecting said bumper with said piston, a guide for said shaft carried by said frame and means associated with said guide for collapsing said shaft after a predetermined motion, whereby the first impact on said bumper will actuate the brake system and injury of said brake system will be prevented by further pressure exerted upon said bumper.

10. The combination with a vehicle frame and a hydraulic brake system carried by said frame comprising a hydraulic cylinder and a piston; of a bumper resiliently mounted on said frame and adapted to be reciprocated in a longitudinal direction in said frame and a collapsible shaft normally rigid connecting said bumper with said piston, whereby an impact on said bumper will actuate said brake system, and means for collapsing said shaft after a predetermined motion whereby further actuation of the brake system will be prevented.

11. The combination with a vehicle frame and a hydraulic brake system carried by said frame comprising a hydraulic cylinder and a piston; of a bumper resiliently mounted on said frame, a reciprocable shaft, normally rigid, connecting said bumper with said brake system, a guide for said shaft carried by said frame, and means associated with said guide for collapsing said shaft after a predetermined motion, whereby the first impact on said bumper will actuate said brake system and injury to said brake system will be prevented by further pressure exerted upon said bumper, and separate means associated with said shaft for cutting the ignition when said shaft is pushed backward.

ROBERT PERILLARD.